United States Patent [19]
Vijeh et al.

[11] Patent Number: 5,388,133
[45] Date of Patent: Feb. 7, 1995

[54] COUNTER FOR ATTRIBUTE STORAGE FOR USE IN A REPEATER

[75] Inventors: Nader Vijeh, Sunnyvale; William Lo, Santa Clara, both of Calif.

[73] Assignee: Advanced Micro Devices, Inc., Sunnyvale, Calif.

[21] Appl. No.: 20,490

[22] Filed: Feb. 22, 1993

[51] Int. Cl.⁶ ............................................. G06M 3/06
[52] U.S. Cl. ...................................... 377/13; 377/26; 377/33
[58] Field of Search ................... 377/13, 26, 33, 37, 377/59, 60, 61, 94, 115, 116, 119

[56] References Cited

U.S. PATENT DOCUMENTS 5,233,545  8/1993  Ho et al. ............................. 377/13

Primary Examiner—Timothy P. Callahan
Assistant Examiner—Shawn Riley
Attorney, Agent, or Firm—Benman Collins & Sawyer

[57] ABSTRACT

A counter for attribute stored in an Ethernet system is partitioned such that the storage section is separated from the incrementors section. In so doing, counters are implemented in a significantly less space than if the counters were implemented as individual counters. The counter utilizes random access memory as the storage section and a 32 bit incrementor. As the incrementor section along with a pair of latches to implement the counter.

12 Claims, 2 Drawing Sheets

COUNTER FOR ATTRIBUTE STORAGE FOR USE IN A REPEATER

FIELD OF INVENTION

The present invention relates generally to the counters utilized with a Medium Access Controller (MAC) in a Repeater for attribute storage and more particularly to the architecture of such counters within the Repeater.

BACKGROUND OF THE INVENTION

In traditional Ethernet (802.3 10BASE5) and Cheapernet (802.3 10BASE2) a coaxial cable provides the linear bus to which all nodes are connected. Signalling is accomplished using a current synch technique with a center conductor used for the signal and a shield used as a ground reference. Twisted pair Ethernet (802.3 10BASE-T) utilizes standard voice grade telephone cable, employing separate transmit and receive pairs. The system uses a star topology. At the center of a star is a repeater. The repeater performs signal amplitude and timing restoration. It takes the incoming bitstream and repeats it to all the ports connected to it. In this sense the repeater acts as a logical coaxial cable so that any node connected to the network will see another node's transmission. Differential signalling is employed with one pair acting as the transmit path and the other pair acting as the receive path.

While repeaters are used in traditionally wired coaxial Ethernet as a means to extend the networks physical distance limit, in the IEEE 802.3 10BASE-T, the Standard mandates the use of a repeater to actually provide the connectivity function if more than two nodes are required. Although the physical signalling on the cabling differs, the functionality of the repeater is identical in either coaxial or twisted pair networks as is the frame or packet format that is used to pass messages between the participating nodes on the network.

The drawing of FIG. 1 shows a representative ethernet packet. Each packet comprises a series of 8-bit bytes of digital information. Each packet is preceded by a seven byte preamble composed of alternating 1s and 0s. The preamble is followed by a one byte long start frame delimiter (SFD) which presents the following eight bit sequence: 10101011. After the SFD, follows a packet that can vary in length from 64 to 1518 bytes. In particular, six bytes (48 bits) of destination address immediately follow the preamble. The destination address designates the intended destination of the packet. After the destination address, follow six bytes of source address which designate the source of the packet. After that, there are two bytes that designate the packet length. Then follow between 46 and 1500 bytes of data. Finally, there are four bytes which constitute the frame checking sequence (FCS) for checking errors.

Since all packets that are transmitted between stations must pass through repeaters, the repeater is the ideal place in which to gather network statistics. These statistics are called attributes.

A media access controller which disassemble the packet performs address checking, error detection, etc. placed within the repeater will allow network statistics to be gathered at the repeater.

The IEEE repeater management standard 802.3K requires attributes related to the packet to be stored in 32 bit counters. The gathering and storing of these attributes can be implemented in hardware or software. A software implementation processor would require significant processor overhead in the operation of the repeater. Hence, for efficiency reasons it is important to implement the statistic gathering and storing in hardware. However, to implement all the attributes as 32 bit counters would not be cost effective because the counters would occupy a significant amount of silicon.

Hence, what is needed is a system for implementing the 32 bit counter to store attributes that is a cost effective solution in accordance with the standard. What is also needed are counters for storing attributes that occupy a minimum amount of space on an integrated circuit. Finally, what is needed are 32 bit counters that are in conformance with the IEEE 802.3K standard. The present invention meets these needs.

SUMMARY OF THE INVENTION

The present invention, through the separation of the storage section from the incrementor, provides a plurality of counters that occupy significantly less space. In placing all the storage cells together allows for a dense implementation of the memory as in a RAM. The number of incrementors required is determined by the number of attributes that must be incremented for any given period of time. Hence, if only one attribute is incremented at a time, only one incrementor is required, if two at a time, then two incrementors are required and so on. Hence multiple 32 bit counters are not required.

This system provides for a cost effective approach for implementing the 32 bit counters required for attribute storage. In addition, it utilizes significantly less silicon area than by having individual 32 bit counters and does not have the overhead constraints of implementing the counters in software.

DETAILED DESCRIPTION

The present invention relates to counters for use with a Media Access Controller (MAC) within a repeater in a local area network. The following description is presented to enable one of ordinary skill in the art to make and use the invention and is provided in the context of a patent application and its requirements. Various modifications to the preferred embodiment will be readily apparent to those skilled in the art. Accordingly, the present invention should only be limited by the genetic principles and features described herein.

A counter implies a storage section and an incrementor section. In the present invention, rather than combining the storage and incrementor sections together to form individual counters, all the storage is combined together and separated from the incrementor. The advantage of partitioning the counters in such a way is that all the counters occupy less space. Placing all the storage together allows for a dense implementation of the storage cells. In this design, the storage cells are implemented as RAM. In addition, if there is no need to increment multiple attributes at the same time only one incrementor is needed to service all the storage cells further reducing the area needed to implement the counters.

Finally, it should be understood by one of ordinary skill in the art that this architecture can be extended by replacing the incrementor with any other complex functions to form complicated "counters".

Figure 1:
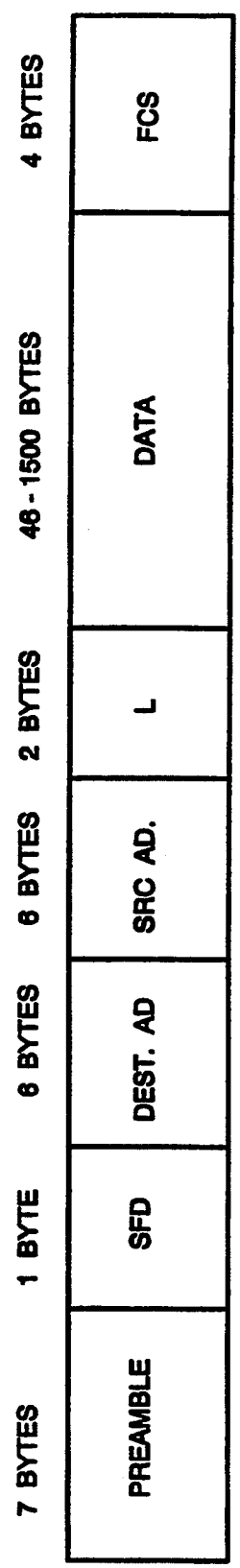
FIG. 1 is a representative 802.3 packet.
Figure 2:
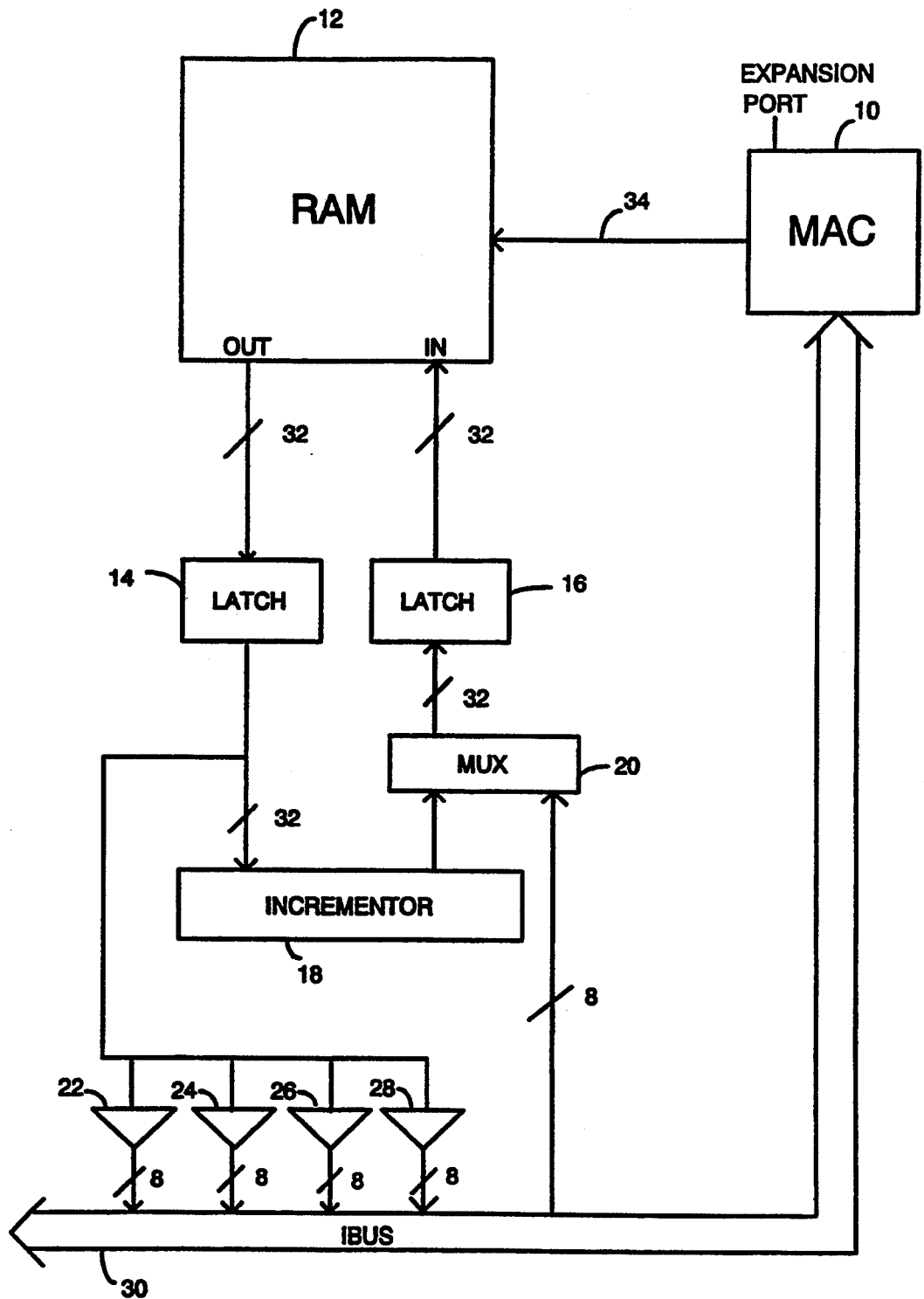
FIG. 2 is a block diagram of preferred embodiment of the counter in accordance with the present invention.

Referring now to FIG. 2, the counter 8 comprises RAM 12 which is coupled to a latch 14 which in turn is coupled to incrementor 18. The latch 14 also provides data to four tristate buffers 22, 24, 26 and 28 which are in turn coupled to an internal bus 30. The incrementor 18 is coupled to multiplexer 20 which also receives signals from internal bus 30. The multiplexer is also coupled to latch 16 which in turn is coupled to RAM 12.

A media access controller (MAC) 10 responsive to appropriate signals on an expansion port which comprises packet data controls RAM 12 via line 34, MAC 10 also is coupled to the internal bus 30.

In this embodiment, latches 14 and 16 are 32 bit latches, and the incrementor 18 is a 32 bit incrementor. It should be understood however by one of ordinary skill in the art that these devices can be of various sizes and there use would be within the spirit and scope of the present invention. To more fully understand the present invention refer now to the following discussion in conjunction with FIG. 2.

MAC 10 controls RAM 12 and RAM 12 is a 32×64 bit memory in this implementation. When a packet is received, MAC 10 extracts information from packet and determines which attributes should be updated. Once the MAC 10 determines which attributes to increment it reads the attribute value from the RAM 12 and places the value into a latch 14. The value in latch 14 is then sent to a 32 bit incrementor 18. The result of the incrementor 18 is stored in a second 32 bit latch 16. The value in the second latch 16 is written back into the RAM 12. Note that the incremented values do not have to be written back into the same RAM location, although they usually are. (The RAM locations must be on the same RAM however.) The operation requires 2 clock cycles—1 to read, 1 to write. The read/write cycle is repeated until all the attributes that need to be updated are updated. Note that the path that the data flows is through the incrementor 18 and not through the internal bus.

For most attributes, the attribute value is incremented by one for each update. There are three (3) other types of attributes. Two are the octet and total octet attribute which may be incremented by more than 1 per update. The other is the source address (SA) attribute. The old SA attribute is replaced by the new SA attribute.

The octet attribute requires that the counter increment by more than 1 per update, one might think an adder is needed to update the octet attribute. However, the octet attribute counts the number of bytes in a frame, and the total octet attribute counts the number of bytes in a packet. Since it takes 8 bit times for a byte to arrive and it takes only 2 bit times to increment an attribute (or 2×2=4 bit times to increment both attributes) the octet count can be incremented as the bytes are arriving. However, since the octet attributes are updated only when certain conditions occur, the previous octet count can not be overwritten until it is determined that the new octet count should be written.

With this architecture, the value from one RAM location can be transferred into another RAM location via the incrementor (same RAM). So in order to update the octet and total octet attributes the value is transferred into a temporary register in the RAM, the temporary register increments once per 8 bit times, and the data is transferred back into the original location when it is determined that the octet attribute should be updated. Note that any transfer whether to different locations or the same location would cause the value to increment by 1. Note that the final transfer from the temporary location back into the original location will add 1 too many to the final octet count. To compensate for this, the transfer into the temporary register should occur on the 16th bit of the frame or packet and not on the 8th bit. (i.e. the first byte is not counted because it will be compensated for by the final transfer.)

Source Address

The source address can be transferred between the RAM 12 and the MAC 10 via the internal bus (IBUS). The transfer occurs 8 bits at a time via internal bus 30. The source address always passes through the 32 bit latch 16 via multiplexer 20 in order to allow 8 bit accesses.

Through this architecture, counters can be implemented efficiently while maintaining compatibility with the IEEE standards. In addition, this improved counter is a cost effective solution to counters utilized to store attributes for repeater management.

Although the present invention has been described in accordance with the embodiments shown in the figures, one of ordinary skill in the art recognizes there could be variations to the embodiments and those variations would be within the spirit and scope of the present invention. Accordingly, many modifications may be made by one of ordinary skills in the art without departing from the spirit and scope of present invention, the scope of which is defined solely by the appended claims.

We claim:

1. A counter for attribute storage in a repeater based system, the repeater based system including an internal bus, the counter comprising:
   random access memory (RAM) means for storing attribute information;
   means coupled to the RAM means for reading the attribute information responsive to control signals from the repeater based system;
   first latching means for receiving attribute information read from the RAM means;
   means coupled to the first latching means for incrementing the attribute information;
   multiplexer means coupled to the internal bus and the incrementing means for receiving a source address, for receiving the incremented attribute information and for sending the source address at a predetermined bit rate;
   second latching means coupled to the multiplexer means and the RAM means for receiving the incremented attribute information and the source address at the predetermined bit rate to allow for access to the RAM means at the predetermined bit rate; and
   means coupled to the second latching means for writing the incremented attribute information into the RAM means responsive to the control signals wherein the reading means and the writing means comprises a media access controller (MAC).

2. The counter of claim 1 in which the first and second latching means are 32 bit latches.

3. The counter of claim 2 in which the incrementing means is a 32 bit incrementor.

4. The counter of claim 3 in which the RAM means is a 32×64 random access memory.

5. The counter of claim 1 in which the source address is transferred from the internal bus to the multiplexer means eight (8) bits at a time.

6. The counter of claim 1 which further includes a tristate buffer means coupled to the internal bus and the first latching means for receiving the attribute information from the first latching means.

7. A counter for attribute storage in a repeater based system, the repeater based system including an internal bus, the counter comprising:

random access memory (RAM) means for storing attribute information;

media access controller (MAC) means coupled to the RAM means for reading attribute information from the RAM means and writing incremented attribute information to the RAM means responsive to control signals from the repeater based system;

a first latch coupled to the RAM means for receiving the attribute information from the RAM means;

an incrementor coupled to the first latch for incrementing the attribute information;

multiplexer coupled to the incrementor and the internal bus for receiving the incremented attribute information and a source address and for sending the source address at a predetermined bit rate; and a second latch coupled to the multiplexer and the RAM means for receiving the incremented attribute information and providing the incremented attribute information to the RAM means responsive to the MAC and the source address at the predetermined bit rate to allow for access to the RAM means at the predetermined bit rate.

8. The counter of claim 7 in which the first and second latch means are 32 bit latches.

9. The counter of claim 8 in which the incrementor is a 32 bit incrementor.

10. The counter of claim 9 in which the RAM means is a 32×64 random access memory.

11. The counter of claim 7 in which the source address is transferred from the internal bus to the multiplexer eight (8) bits at a time.

12. The counter of claim 7 which further includes a tristate buffer means coupled to the internal bus and the first latching means for receiving the attribute information from the first latching means.

* * * * *